United States Patent [19]

Nogami et al.

[11] Patent Number: 4,600,828
[45] Date of Patent: Jul. 15, 1986

[54] AUTOMATIC ISSUANCE OF PASSBOOKS AND THE LIKE

[75] Inventors: Masaru Nogami, Odawara; Masafumi Inaba, Fujisawa; Yoshitaka Oki, Chigasaka, all of Japan

[73] Assignee: NCR Corporation, Dayton, Ohio

[21] Appl. No.: 653,814

[22] Filed: Sep. 24, 1984

[30] Foreign Application Priority Data

Sep. 30, 1983 [JP] Japan .............................. 58-180962

[51] Int. Cl.⁴ .............................................. G06F 15/30
[52] U.S. Cl. .................................................... 235/379
[58] Field of Search ........................................ 235/379

[56] References Cited

U.S. PATENT DOCUMENTS 4,280,036  7/1981  Fukatsu ............................. 235/379

*Primary Examiner*—Harold I. Pitts
*Attorney, Agent, or Firm*—Wilbert Hawk, Jr.; Edward Dugas; Richard W. Lavin

[57] ABSTRACT

A system for issuing passbooks and other multiple-page documents includes a plurality of storage bins for storing such passbooks and documents in a closed position, feed means for feeding a passbook and the documents from the storage bins along a guide chute, a printing mechanism for printing data on a passbook and documents located in the guide chute, a page-turning mechanism for opening the cover and the inner pages of the passbook prior to a printing operation, a transducer for reading coded labels on the inner surface of the cover and the inner pages of the passbook, a magnetic read-write transducer for reading and recording data on the cover of the passbook and control means for sequentially operating said printing means and page turning mechanisms and said transducers for issuing the passbook or other type of multiple-page document.

13 Claims, 3 Drawing Figures

AUTOMATIC ISSUANCE OF PASSBOOKS AND THE LIKE

CROSS-REFERENCE TO RELATED APPLICATION

Automatic Document Page-Turning Apparatus, U.S. Pat. No. 4,545,141, filed on even date herewith, invented by Masakazu Ito and Hikaru Izawa, assigned to the NCR Corporation.

BACKGROUND OF THE INVENTION

The present invention relates generally to feeding apparatuses and, more particularly, to an apparatus for feeding passbooks and other legal documents from a storage area to a customer retrieval area.

In recent years, there has been a trend to automate banking functions as they relate to bank customers. Examples of this trend is the Automatic Teller Machines (ATM's) which provides remote banking functions without the presence of a bank teller. Presently, the ATM's are limited to issuing money and receipts, both of which comprise single-sheet documents. Other banking functions which have been investigated is the automatic issuance of passbooks and other types of multiple-sheet documents such as bonds or certificates of deposit. An example of a prior art passbook issuing apparatus may be found in U.S. Pat. No. 4,280,036. The limitations found in the prior art is that, due to the thickness of the cover of the passbook, the passbook has been required to be inserted into the printing and feeding apparatus in an open condition wherein the apparatus prints on the pages of the passbook and then feeds the open passbook to a discharged area.

It is therefore a principal object of this invention to provide a system for automatically issuing passbooks in a closed condition from a storage area. It is another object of this invention to provide an automatic passbook issuing system in which data inputted by a customer or a bank clerk through an input terminal device is printed on the passbook after which the passbook is transported to a discharged area.

SUMMARY OF THE INVENTION

These and other objects of the invention are fulfilled by providing a system for issuing passbooks and other banking documents which includes a plurality of storage bins for respectively storing a number of different types of unused passbooks and other types of legal documents such as bonds or certificates of deposit, a main control section consisting of a memory unit and a microprocessor unit adapted for controlling the issuance of passbooks and the like in response to a command from a central computer or processing unit, a feed control section for controlling the feeding of the passbooks under the control of the main control section, feeding means which are provided in the respective outlet of said plurality of storage bins to feed the passbooks seriatim from the storage bins under the control of said feed control section, a guide chute along which said passbooks are transported, a printing section including a print mechanism for printing data in said passbook, a page-turning section for turning the cover and the succeeding pages of the passbook prior to a printing operation, a magnetic read-write transducer, and an interface section connected to a plurality of bank terminals and said central computer wherein said printing station, said page-turning section and said magnetic read-write transducer, located adjacent said guide chute, are sequentially operated for processing and issuing the passbook or other type of bank document.

BRIEF DESCRIPTION OF THE DRAWING

Additional advantages and features of the present invention become apparent and fully understood from the reading of the following description, taken in conjunction with the annexed drawing, in which.

DESCRIPTION OF A PREFERRED EMBODIMENT

Figure 1:
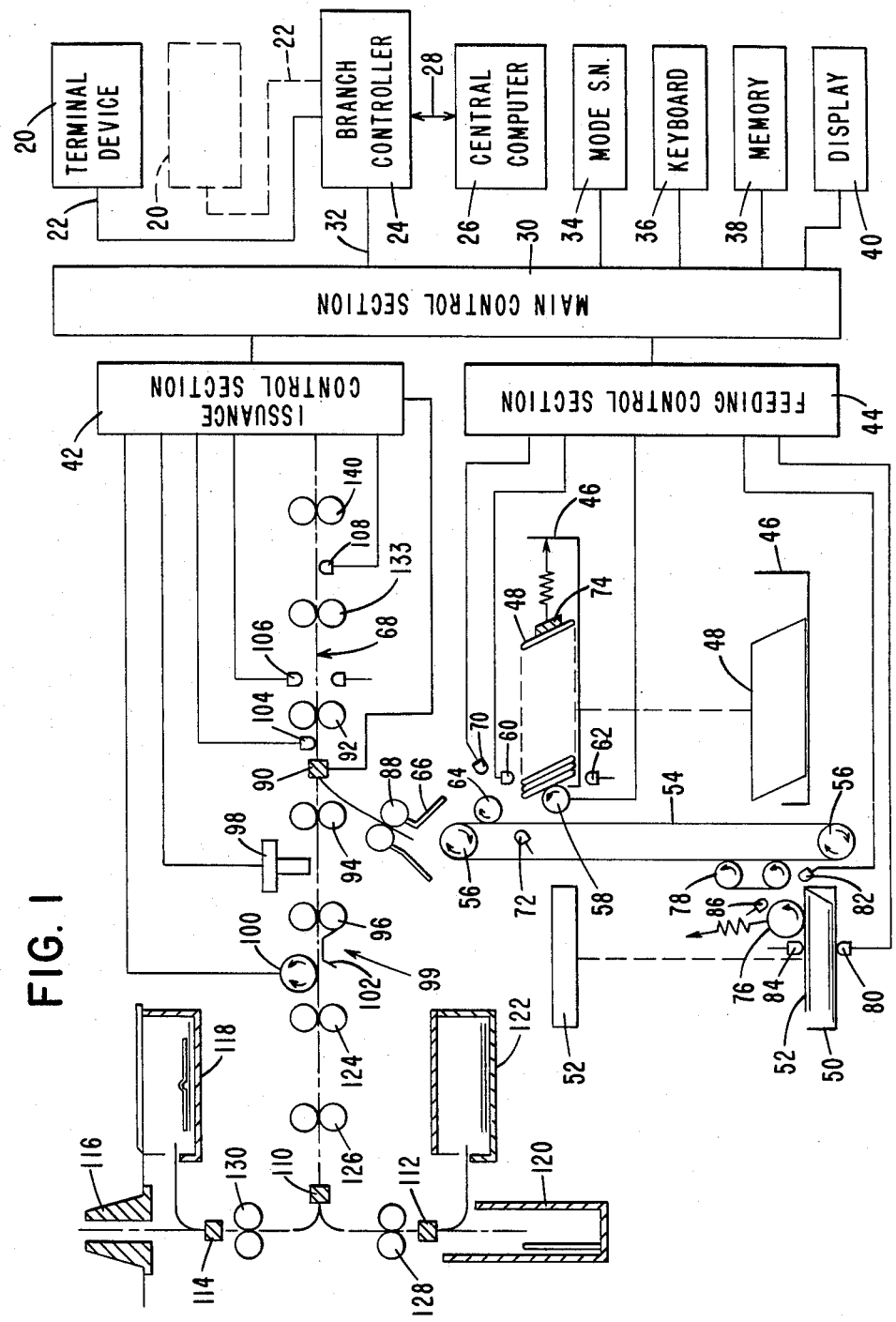
FIG. 1 is a schematic diagram of the passbook issuing system of the present invention.

Referring now to FIG. 1, there is disclosed a schematic diagram of the passbook issuing system of the present invention which includes a plurality of remote terminal devices 20 through which a bank clerk or a customer inputs the required data such as the name of the customer, the kind of document required, the number of the account, etc., needed to issue a passbook or a certificate of deposit or bond. This information is transmitted over line 22 to a branch controller 24 and from there to a central or remote computer or processor 26 over the bus 28. The computer 26 in response to receiving the data from the terminal device 20 is programmed to output a plurality of control signals over bus 28 and through the controller 24 to a main control section 30 over bus 32. The control section 30 also receives control signals from a clerk-operated mode switch 34, a keyboard 36 by which a password may be entered by the clerk or customer and a memory device 38 for storing data associated with the document issuing transaction and a display 40 for displaying data concerning the transaction or lead through instructions.

The main control section 30 in response to the data received will control the operation of an issuance control section 42 which controls the issuance of a document such as a passbook or a bond. The control section 30 also controls a feeding control section 44 which controls the feeding of the documents from a storage area to a document issuance section for processing therein. Associated with the feeding control section 44 is a plurality of first storage bins 46 each storing one of a number of different types of passbooks 48 in a closed position and a plurality of second storage bins 50 each storing a number of different types of bank documents 52. Associated with each of the storage bins 46 and 50 is a vertically oriented rotatably mounted conveyor belt 54 driven by a pair of rollers 56 whose direction of rotation is controlled by a motor (not shown) which in turn is controlled by the feeding control section 44.

Associated with each of the bins 46 is a pick-up roller 58 whose operation is controlled by the feeding control section 44 and a photodetector 60 which is energized by a light source 62 for detecting the presence of a passbook in the storage bin 46. A drive roller 64 feeds the passbook along the conveyor belt 54 to the entrance portion 66 of a horizontal guide chute 68. A photodetector 70 and a light source 72 mounted adjacent the conveyor belt 54 and the drive roller 64 cooperate to detect the presence of a passbook being fed by the roller 58 into engagement with the drive roller 64 and the conveyor belt 54. Both photodetectors 60 and 70 are connected to the feeding control section 44 which may operate the display 40 to indicate that a storage bin 46 is empty of passbooks. The passbooks 48 are held in the bin by a spring urged pressure member 74. The remaining storage bins 46 are similarly constructed.

In a similar manner, each of the document bins 50 has associated therewith a spring urged pickup drive roller 76 for moving the top document 52 into engagement with a pair of drive rollers 78 which cooperate with the conveyor belt 54 to drive the document 52 along the belt to the entrance portion 66 of the guide chute 68. A pair of photodetectors 80 and 82 mounted adjacent the storage bins 50 are connected to the control section 44 to detect the presence of a document in the bin 50 and in engagement with the drive rollers 78 respectively. Light sources 84 and 86 operate in conjunction with the photodetectors 80 and 82 respectively in a manner that is well-known in the art.

Located at the entrance portion 66 of the guide chute 68 are a pair of feed rollers 88 which drive either a document 52 or a passbook 48 from the conveyor belt 54 into a gate section 90 controlled by the issuance control section 42 which positions the document or the passbook in the horizontal portion of the guide chute 68. If the document being transported is a passbook 48, the issuance control section 42 will close the gate section 90 after the passbook has been located in the guide chute 68 and enable the feed rollers 92-96 inclusive to move the passbook 48 to a printing station which comprise a printing mechanism 98 where data is printed on the cover of the passbook under the control of the issuance control section 42 in response to control signals transmitted from the main control section 30. Associated with the printing mechanism 98 is a page turning mechanism generally indicated by the numeral 99 comprising a reversing drive roller 100 and a U-shaped drive plate 102 which is moved vertically to bend the cover and the pages of the passbook 48 to a bowed position to be rotated to an open position by the drive roller 100. For a complete description of the page turning mechanism, reference should be made to the previously cited co-pending application of Ito et al.

Located adjacent the guide chute 68 is a code reading station comprising a transducer 104, a double feed detector 106, a magnetic read write transducer 108 and a plurality of gate sections 110-114 inclusive which are selectively operated by the issuance control section 42 to locate a document 52 or a passbook 48 in a discharge section 116 or a temporary storage bin 118, a double feed document 52 in a collection bin 120, or an invalid passbook 48 in a collection bin 122.

In the operation of the system, a customer or a bank clerk will enter data in one of the terminal devices 20 or the keyboard 36 in accordance with the type of bank document to be issued. In the case of a passbook, data such as the kind of passbook (savings, checking, etc.) desired, the number of the account, the name of the customer, etc. is entered. In the case of a customer desiring to open an account, the terminal device 20 may take the form of an automatic teller machine (ATM) which includes money receiving means, guidance means and keyboard means. The data inputted by the customer in the terminal device 20 which may include the amount of money deposited is sent to the central computer 26 through the branch controller 24 resulting in the opening of the account and the automatic issuance of a passbook.

Further included in the operation of the system where a bank clerk is involved, the clerk will switch the mode switch 34 to the offline mode position to load the storage bins 46 with passbooks 48 and the storage bins 50 with bank documents 52 such as bonds or certificates of deposit if needed. The clerk will also insert into the memory device 38 through the keyboard 36, the data and a clerk identification number together with the number of passbooks 48 and bank documents 52 stored in the storage bins 46 and 50 respectively. As the passbooks 48 and the documents 52 are issued, the number of passbooks and documents remaining in the storage bins are stored in the memory device 38 for use in the inventory control of the items.

The data concerning the issuance of a passbook 48 or a bank document 52 stored in the central computer 26 is transmitted to the main control system 30 and from there to the feeding control section 44 and the issuance control section 42. The data transmitted from the computer 26 to the main control station 30 is also stored in the memory device 38. The feeding control section 44 in response to receiving the data from the main control section 30 will operate the pick-up feed roller 58 to feed a passbook 48 from one of the storage bins 46 or the feed roller 76 to feed a bank document 52 from one of the storage bins 50. The vertically oriented conveyor belt 54 is operated by the feeding control section 44 in the required direction to feed the passbook 48 or the document 52 through the feed rollers 88 and through the gate section 90 which has been operated by the issuance control section 42 to a position in the horizontal portion of the guide chute 68. After the passbook 48 or document 52 has been located in the guide chute 68, processing of the items will then take place. In the case of a bank document 52, the double feed detector 106 will detect the presence of an overlapped document. If the document 52 is found to comprise an overlapped document, the document is transported along the guide chute 68 by the feed rollers 94, 96, 124 and 126, through the gate section 110 which has been operated by the issuance control section 42 in response to the operation of the detector 106 to deflect the document in a downward direction to be transported by the feed rollers 128 through the gate section 112 operated to divert the document into the collection bin 120.

If the document 52 has been found to be a single document by the detector 106, the document is transported by the feed rollers 92-96 inclusive to the print station in which the printing mechanism 98 prints data such as the name of the customer, the account number, etc. on the document, the data being transmitted from the computer 26 to the printing mechanism 98 through the branch controller 24 and the control sections 30 and 42. After the printing operation has occurred, the document 52 is then transmitted by the feed rollers 124 and 126 through the gate section 110 which has been operated to deflect the document in an upward direction for engagement by the feed rollers 130 which in turn moves the document through the gate section 114 to either the discharge outlet 116 or the temporary storage bin 118.

Figure 2:
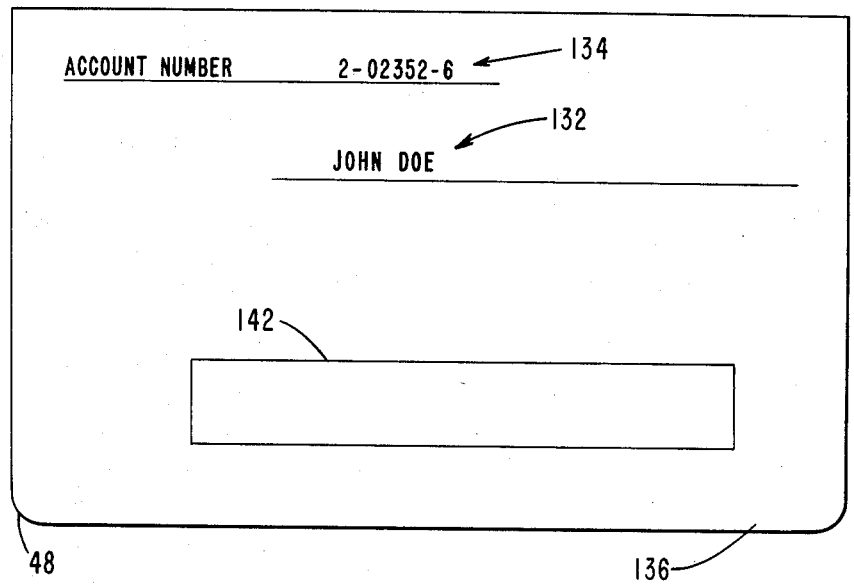
FIG. 2 is a planned view of the cover of a passbook.

When a passbook 48 is positioned within the guide chute 68, the passbook is in a closed condition. The passbook 48 (FIG. 2) is then transported to the printing mechanism 98 where the mechanism prints the name of the customer 132 and the account number 134 on the cover 136 of the passbook. This data is retrieved from the computer 26 in the manner previously described. At the completion of the printing operation, the passbook 48 is transported by the feed rollers 92-94, 138 and 140 to a position adjacent the magnetic read/write transducer 108 which writes the identification number or password of the customer and the account number in a magnetic stripe 142 (FIG. 2) located on the cover 136 of the passbook 48.

Figure 3:
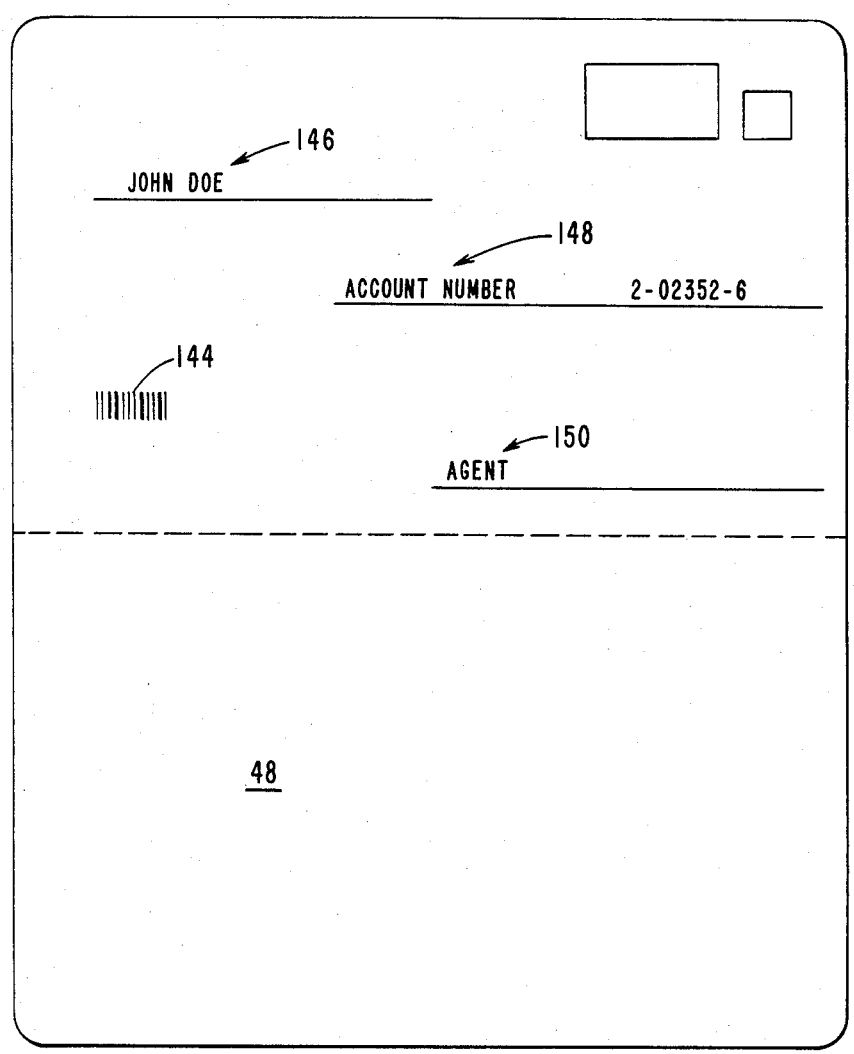
FIG. 3 is a planned view of the passbook showing the cover of the passbook in an open position.

After the required data has been magnetically recorded on the cover of a passbook 48, the passbook is transported to the page-turning mechanism 99. As previously described, the page turning mechanism includes a drive roller 100 for turning the cover or the pages of the passbook and a drive plate 102 which is movable in a vertical direction to bow the passbook whereby the cover or the top page of the passbook is moved into engagement with the drive roller 100 enabling the roller 100 to turn over the cover 136 of the passbook 48 and the subsequent pages of the passbook in the manner fully disclosed in the previously-cited Ito et al. co-pending application. The opening of the passbook cover 136 exposes a bar code label 144 (FIG. 3) which contains data indicating the type of passbook and the page number. Each and every succeeding page of the passbook contains a similar bar code label which is used in verifying the data printed on the page with the data stored in the memory device 38. The open passbook 48 is then moved to the code reading station where the read head 104 will read the bar code label 144 in a manner that is well known in the art. If in comparing the data stored in the label 144 with the data stored in the memory device 38, it is found that for some reason the passbook is invalid, the passbook is transported through the gate sections 110 and 112 for deposit in the collection bin 122 (FIG. 1).

If in checking the data contained in the label 144, the passbook is found to be valid, the open passbook is then transported to the printing mechanism 98 where the mechanism will print the name 146 (FIG. 3) of the customer, the account number 148 and the name of the bank or paying agent 150. After the printing operation has been completed, the passbook is transported back to the page turning mechanism 99 where the drive roller 100 turns over the next page on which deposits are to be recorded. The passbook 48 is then transported to the code reading station where the read head 104 will read the bar code label 144 on the page verifying the open page after which the passbook is transported back to the printing station where the printing mechanism 98 will print the data associated with a deposit transaction such as the date, the amount deposited and the balance. If the transaction requires data to be printed on subsequent pages, the passbook is returned to the page turning mechanism 99 where the next page is exposed for printing. This sequence of operation continues until the transaction is complete. The passbook 48 is then transported to the discharge outlet 116 for retrieval by the customer or to the temporary storage bin 118. The main control section 30 will then generate data relating to the number of passbooks 48 and documents 52 remaining in the storage bins for use in establishing inventory data.

It will be seen that the system provides for the automatic issuance of a passbook or a bank document with a passbook being stored in a closed position and without requiring the passbook to be opened manually. In addition, there is provided a feed system for issuing any number of different types of passbooks or bank documents. The operation of the system allows a customer to automatically open his own account without the need of a bank clerk, the customer receiving the passbook or the bank document which has been completely documented in the prescribed manner.

While the principles of the invention have now been made clear in an illustrated embodiment, it will be obvious to those skilled in the art that many modifications of structure, arrangements, elements and components can be made which are particularly adapted for specific environments without departing from those principals. The appended claims are therefore intended to cover and embrace any such modifications within the limits only of the true spirit and scope of the invention.

We claim:

1. An apparatus for issuing passbooks or the like having a cover and at least one page comprising;
   first storage means for storing a plurality of passbooks each in a closed position;
   first means for selectively feeding a passbook from the first storage means into a feed path;
   printing means positioned adjacent said feed path for printing data on the top surface of the passbook;
   means positioned adjacent said feed path for turning the cover and the page of the passbook to an open position;
   second means for feeding the passbook in the opposite direction along said feed path between said printing means and said turning means when operated;
   and control means for sequentially operating said first and second feeding means, said printing means and said page-turning means for printing data on the cover and the page of the passbook.

2. The apparatus of claim 1 which further includes second storage means for storing a plurality of multiple-page documents;
   third means for selectively feeding the multiple-page document from the second storage means into said feed path;
   means positioned adjacent said feed path for generating a first control signal upon detecting the presence of an overlapped multiple-page document;
   third storage means positioned in said feed path;
   and said control means being connected to said generating means for operating said second feeding means in response to the generation of said first control signal whereby said second feeding means will feed the overlapped document into said third storage means.

3. The apparatus of claim 2 in which the inner surface of the cover and each page of the passbook includes a coded label representing data pertaining to type of passbook being processed, said apparatus further includes means positioned adjacent said feed path for reading the coded label upon movement of the passbook along the feed path.

4. The apparatus of claim 3 in which the top surface of the cover of the passbook includes a magnetic portion, said apparatus further including magnetic recording means positioned adjacent said feed path for recording data pertaining to the identification of the owner of the passbook on the magnetic portion of the cover of the passbook.

5. The apparatus of claim 4 in which said first feeding means includes a conveyor member positioned adjacent said first storage means for feeding a passbook from the first storage means to said feed path.

6. An apparatus for issuing passbooks or the like having a cover member and at least one other inner page member comprising;

a remote input device for inputting data pertaining to the issuance of a passbook or the like;

processor means for storing the data inputted by the input device;

first storage means for storing a plurality of passbooks in a closed position;

first means for selectively feeding a passbook from the first storage means into a feed path;

a plurality of first feed rollers positioned adjacent the feed path for feeding the passbook along said feed path;

a printing mechanism positioned adjacent the feed path for printing data stored in said processor means on the top surface of the passbook;

turning means positioned adjacent said feed path for turning the cover member and the inner page members of the passbook to an open position;

and control means connected to said processor means for sequentially operating said first feeding means, said first feed rollers, said printing mechanism and said turning means enabling said printing member to print data stored in said processor means on the cover and the inner page member of the passbook.

7. The apparatus of claim 6 which further includes second storage means for storing a plurality of multiple-page documents;

second means for selectively feeding a multiple-page document from the second storage means into said feed path;

first photodetector means positioned adjacent said feed path for generating a first control signal upon detecting the presence of a double-fed multiple-page document;

third storage means positioned adjacent said feed path;

and said control means connected to said first photodetector means for operating said first feed rollers in response to the generation of said first control signals whereby said first feed rollers will feed the overlapped document to said first storage means.

8. The apparatus of claim 7 in which the inner surface of the cover member and each page member of the passbook includes a coded label representing data pertaining to the type of passbook issued, said apparatus further including transducer means positioned adjacent said first feed path for reading the coded label upon movement of the passbook along the feed path.

9. The apparatus of claim 8 in which the top surface of the cover member includes a magnetic recording portion, said apparatus further includes magnetic transducer means positioned adjacent said feed path for recording data pertaining to the identification of the owner of the passbook on the magnetic portion of the cover member of a passbook.

10. The apparatus of claim 9 in which said first feeding means includes a conveyor member positioned adjacent said first and second storage means for feeding a passbook to the feed path and second feed rollers positioned adjacent said first and second storage means for feeding the passbook from the storage means to said conveyor mechanism.

11. A method for issuing passbooks or the like comprising steps of;

storing in a storage member a passbook in a closed position;

transporting the closed passbook from the storage member along a guide chute to a printing station;

printing data on the closed cover of the passbook;

magnetically recording further data on the closed cover of the passbook;

moving the passbook into a bowed configuration;

rotating the bowed cover of the passbook to a partially open position;

moving the partially open cover against a stationary member for moving the cover to a fully open position;

moving the open passbook to the printing station;

printing data on the open cover;

and moving the open passbook to an exit receptacle.

12. The method of claim 11 which further includes the steps of moving the open passbook along the guide chute to a scanning station and scanning a coded label on the exposed surface of the cover.

13. The method of claim 12 which further includes the steps of moving the closed passbook to a recording station and magnetically recording data identifying the owner of the passbook on the closed cover of a passbook.

* * * * *